US012649111B2

(12) United States Patent
John

(10) Patent No.: US 12,649,111 B2
(45) Date of Patent: *Jun. 9, 2026

(54) VIDEO GAMING SYSTEM ENVIRONMENTS PROVIDING MINI-GAMES

(71) Applicant: Truist Bank, Charlotte, NC (US)

(72) Inventor: Michael Taylor John, San Francisco, CA (US)

(73) Assignee: TRUIST BANK, Charlotte, NC (US)

( * ) Notice: Subject to any disclaimer, the term of this patent is extended or adjusted under 35 U.S.C. 154(b) by 243 days.

This patent is subject to a terminal disclaimer.

(21) Appl. No.: 18/476,820

(22) Filed: Sep. 28, 2023

(65) Prior Publication Data

US 2025/0108304 A1 Apr. 3, 2025

(51) Int. Cl.
| | |
|---|---|
| *A63F 13/73* | (2014.01) |
| *A63F 13/216* | (2014.01) |
| *A63F 13/335* | (2014.01) |
| *A63F 13/53* | (2014.01) |
| *A63F 13/65* | (2014.01) |
| *A63F 13/79* | (2014.01) |
| *A63F 13/88* | (2014.01) |

(52) U.S. Cl.
CPC ............ *A63F 13/73* (2014.09); *A63F 13/216* (2014.09); *A63F 13/335* (2014.09); *A63F 13/53* (2014.09); *A63F 13/65* (2014.09); *A63F 13/79* (2014.09); *A63F 13/88* (2014.09)

(58) Field of Classification Search
None
See application file for complete search history.

(56) References Cited

U.S. PATENT DOCUMENTS

| | | | | |
|---|---|---|---|---|
| 9,440,151 | B2 * | 9/2016 | Van Luchene | A63F 13/792 |
| 9,669,293 | B1 * | 6/2017 | Kornmann | A63F 13/216 |
| 11,007,429 | B2 * | 5/2021 | Franceus | A63F 13/211 |
| 11,179,638 | B1 * | 11/2021 | Linden | A63F 13/79 |
| 11,902,280 | B1 * | 2/2024 | Cheng | H04L 63/101 |
| 2005/0261062 | A1 * | 11/2005 | Lewin | A63F 13/77 463/42 |
| 2007/0225071 | A1 * | 9/2007 | Van Luchene | A63F 13/537 463/29 |
| 2008/0200253 | A1 * | 8/2008 | Van Luchene | G07F 17/3232 463/42 |

(Continued)

*Primary Examiner* — Seng H Lim

(74) *Attorney, Agent, or Firm* — Michael A. Springs, Esq.; Shumaker, Loop & Kendrick, LLP; Patrick B. Horne

(57) ABSTRACT

Systems and methods track user progress, via a user resource profile, towards achieving real-world goal(s) based on a plurality of resource-related actions performed by a user, at least one of the plurality of resource-related actions comprising storing a real-world resource to a user-specific location, the user resource profile providing information about the user-specific location, and determine, from the user resource profile, that the user is not progressing to achieve the real-world goal(s). Based on determining the user is not progressing, user access to task(s) that can be performed by the user via an online video game is restricted, the restricting exempting, based on satisfaction of a real-world resource condition of the real-world resource associated with the user-specific location, a mini-game playable within the online video game, the mini-game including feature(s) limiting playability by the user.

20 Claims, 11 Drawing Sheets

(56)                    References Cited

U.S. PATENT DOCUMENTS

| 2008/0270240 | A1* | 10/2008 | Chu | G06Q 30/0239 |
| | | | | 434/350 |
| 2012/0123835 | A1* | 5/2012 | Chu | G06Q 30/0239 |
| | | | | 705/14.12 |
| 2014/0004944 | A1* | 1/2014 | Lee | A63F 13/87 |
| | | | | 463/31 |
| 2014/0066177 | A1* | 3/2014 | Zalewski | A63F 13/60 |
| | | | | 463/24 |
| 2014/0149200 | A1* | 5/2014 | Chatterjee | G06Q 30/0226 |
| | | | | 705/14.33 |
| 2014/0295975 | A1* | 10/2014 | Van Luchene | G07F 17/3244 |
| | | | | 463/42 |
| 2016/0300502 | A1* | 10/2016 | Dudek | G09B 7/02 |
| 2019/0270020 | A1* | 9/2019 | Miura | A63F 13/533 |
| 2019/0351329 | A1* | 11/2019 | Anderson | A63F 13/23 |
| 2020/0092373 | A1* | 3/2020 | Kurian | H04L 67/55 |
| 2022/0103562 | A1* | 3/2022 | Ziembicki | H04M 15/853 |
| 2024/0058705 | A1* | 2/2024 | Brown | G06Q 20/389 |
| 2025/0205607 | A1 | 6/2025 | Lida | |

* cited by examiner

800

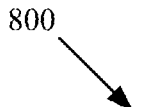

TRACK USER PROGRESS, VIA A USER RESOURCE PROFILE, TOWARDS ACHIEVING ONE OR MORE REAL-WORLD GOALS BASED ON A PLURALITY OF RESOURCE-RELATED ACTIONS PERFORMED BY A USER, AT LEAST ONE OF THE PLURALITY OF RESOURCE-RELATED ACTIONS COMPRISING STORING A REAL-WORLD RESOURCE TO A USER-SPECIFIC LOCATION, WHEREIN THE USER RESOURCE PROFILE PROVIDES, AT LEAST IN PART, INFORMATION ABOUT THE USER-SPECIFIC LOCATION
805

DETERMINE, FROM THE USER RESOURCE PROFILE, THAT THE USER IS NOT PROGRESSING TO ACHIEVE THE ONE OR MORE REAL-WORLD GOALS
810

RESTRICT, BASED ON THE DETERMINING THAT THE USER IS NOT PROGRESSING, USER ACCESS TO ONE OR MORE TASKS THAT CAN BE PERFORMED BY THE USER VIA AN ONLINE VIDEO GAME, THE RESTRICTING EXEMPTING, BASED ON SATISFACTION OF A REAL-WORLD RESOURCE CONDITION OF THE REAL-WORLD RESOURCE ASSOCIATED WITH THE USER-SPECIFIC LOCATION, A MINI-GAME PLAYABLE WITHIN THE ONLINE VIDEO GAME, THE MINI-GAME COMPRISING ONE OR MORE FEATURES LIMITING PLAYABILITY BY THE USER
815

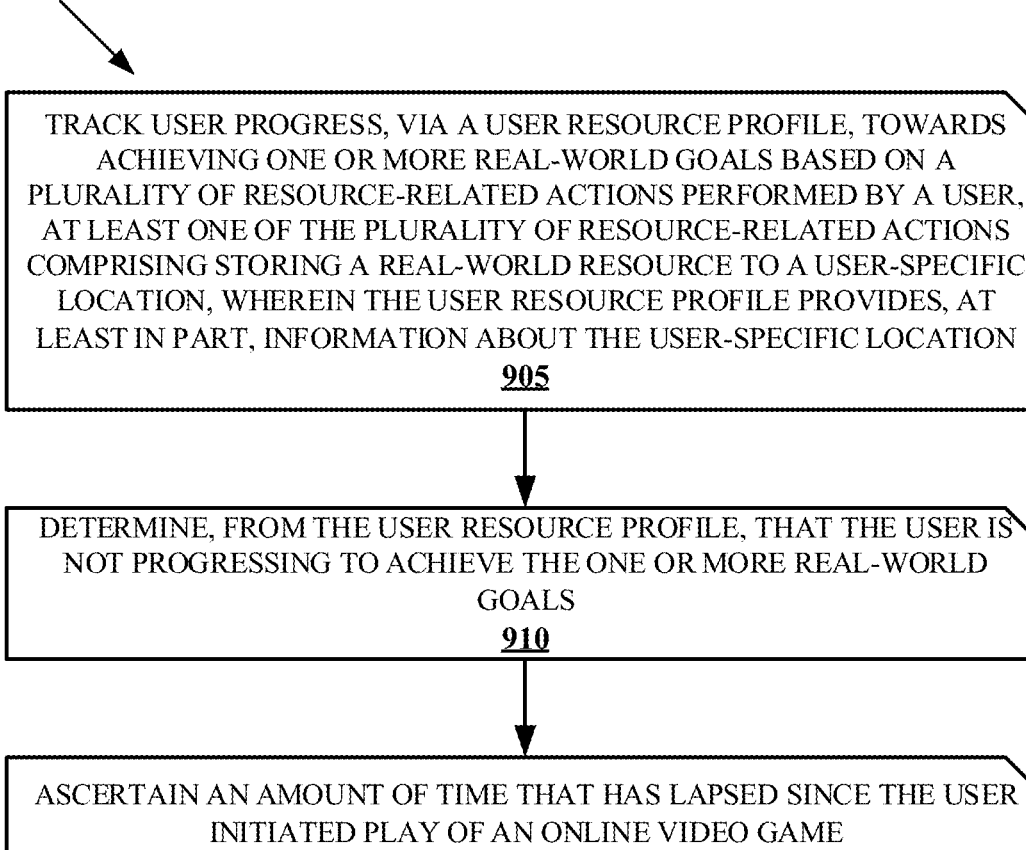

TRACK USER PROGRESS, VIA A USER RESOURCE PROFILE, TOWARDS
ACHIEVING ONE OR MORE REAL-WORLD GOALS BASED ON A
PLURALITY OF RESOURCE-RELATED ACTIONS PERFORMED BY A USER,
AT LEAST ONE OF THE PLURALITY OF RESOURCE-RELATED ACTIONS
COMPRISING STORING A REAL-WORLD RESOURCE TO A USER-SPECIFIC
LOCATION, WHEREIN THE USER RESOURCE PROFILE PROVIDES, AT
LEAST IN PART, INFORMATION ABOUT THE USER-SPECIFIC LOCATION
905

DETERMINE, FROM THE USER RESOURCE PROFILE, THAT THE USER IS
NOT PROGRESSING TO ACHIEVE THE ONE OR MORE REAL-WORLD
GOALS
910

ASCERTAIN AN AMOUNT OF TIME THAT HAS LAPSED SINCE THE USER
INITIATED PLAY OF AN ONLINE VIDEO GAME
915

RESTRICT, BASED ON THE DETERMINING THAT THE USER IS NOT
PROGRESSING, USER ACCESS TO ONE OR MORE TASKS THAT CAN BE
PERFORMED BY THE USER VIA THE ONLINE VIDEO GAME, THE
RESTRICTING EXEMPTING A MINI-GAME PLAYABLE WITHIN THE
ONLINE VIDEO GAME IF THE AMOUNT OF TIME THAT HAS LAPSED IS
LESS THAN A PREDEFINED THRESHOLD LIMIT, THE MINI-GAME
COMPRISING ONE OR MORE FEATURES LIMITING PLAYABILITY BY THE
USER
920

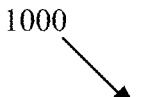

TRACK, VIA A USER RESOURCE PROFILE, USER PROGRESS TOWARDS ACHIEVING ONE OR MORE REAL-WORLD GOALS BASED ON A PLURALITY OF RESOURCE-RELATED ACTIONS PERFORMED BY A USER, AT LEAST ONE OF THE PLURALITY OF RESOURCE-RELATED ACTIONS COMPRISING STORING A REAL-WORLD RESOURCE TO A USER-SPECIFIC LOCATION, WHEREIN THE USER RESOURCE PROFILE PROVIDES, AT LEAST IN PART, INFORMATION ABOUT THE USER-SPECIFIC LOCATION
1005

DETERMINE, FROM THE USER RESOURCE PROFILE, THAT THE USER IS NOT PROGRESSING TO ACHIEVE THE ONE OR MORE REAL-WORLD GOALS
1010

RESTRICT, BASED ON THE DETERMINING THAT THE USER IS NOT PROGRESSING, USER ACCESS TO ONE OR MORE TASKS THAT CAN BE PERFORMED BY THE USER VIA AN ONLINE VIDEO GAME, THE RESTRICTING EXEMPTING, BASED ON ONE OR MORE PREDEFINED CONDITIONS, A MINI-GAME PLAYABLE WITHIN THE ONLINE VIDEO GAME, THE MINI-GAME COMPRISING ONE OR MORE FEATURES LIMITING PLAYABILITY BY THE USER
1015

TRANSMIT, ACROSS A NETWORK, TO A USER DEVICE AN ELECTRONIC COMMUNICATION COMPRISING AN EMBEDDED LINK TO ACCESS THE MINI-GAME
1020

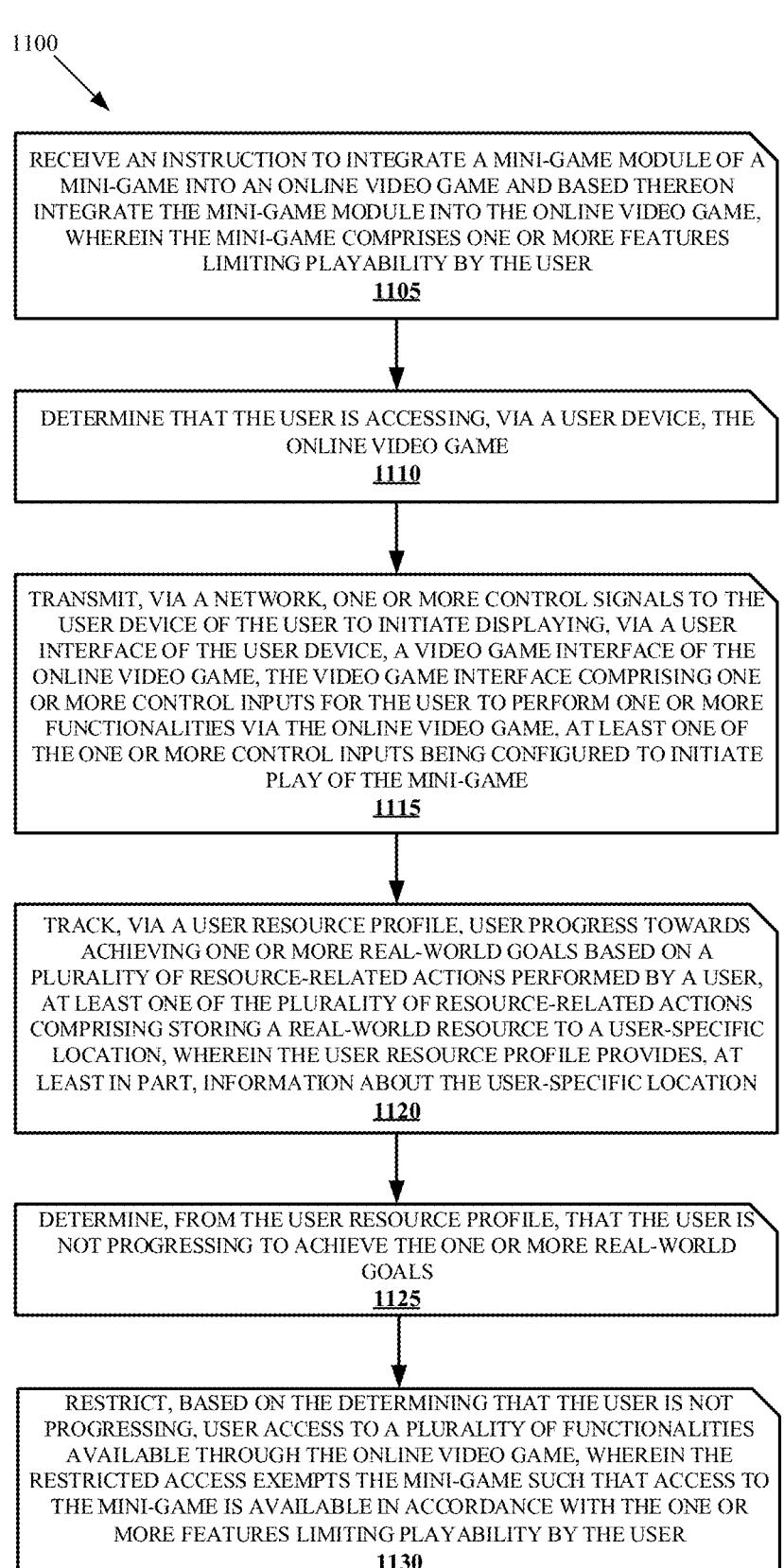

RECEIVE AN INSTRUCTION TO INTEGRATE A MINI-GAME MODULE OF A MINI-GAME INTO AN ONLINE VIDEO GAME AND BASED THEREON INTEGRATE THE MINI-GAME MODULE INTO THE ONLINE VIDEO GAME, WHEREIN THE MINI-GAME COMPRISES ONE OR MORE FEATURES LIMITING PLAYABILITY BY THE USER
1105

DETERMINE THAT THE USER IS ACCESSING, VIA A USER DEVICE, THE ONLINE VIDEO GAME
1110

TRANSMIT, VIA A NETWORK, ONE OR MORE CONTROL SIGNALS TO THE USER DEVICE OF THE USER TO INITIATE DISPLAYING, VIA A USER INTERFACE OF THE USER DEVICE, A VIDEO GAME INTERFACE OF THE ONLINE VIDEO GAME, THE VIDEO GAME INTERFACE COMPRISING ONE OR MORE CONTROL INPUTS FOR THE USER TO PERFORM ONE OR MORE FUNCTIONALITIES VIA THE ONLINE VIDEO GAME, AT LEAST ONE OF THE ONE OR MORE CONTROL INPUTS BEING CONFIGURED TO INITIATE PLAY OF THE MINI-GAME
1115

TRACK, VIA A USER RESOURCE PROFILE, USER PROGRESS TOWARDS ACHIEVING ONE OR MORE REAL-WORLD GOALS BASED ON A PLURALITY OF RESOURCE-RELATED ACTIONS PERFORMED BY A USER, AT LEAST ONE OF THE PLURALITY OF RESOURCE-RELATED ACTIONS COMPRISING STORING A REAL-WORLD RESOURCE TO A USER-SPECIFIC LOCATION, WHEREIN THE USER RESOURCE PROFILE PROVIDES, AT LEAST IN PART, INFORMATION ABOUT THE USER-SPECIFIC LOCATION
1120

DETERMINE, FROM THE USER RESOURCE PROFILE, THAT THE USER IS NOT PROGRESSING TO ACHIEVE THE ONE OR MORE REAL-WORLD GOALS
1125

RESTRICT, BASED ON THE DETERMINING THAT THE USER IS NOT PROGRESSING, USER ACCESS TO A PLURALITY OF FUNCTIONALITIES AVAILABLE THROUGH THE ONLINE VIDEO GAME, WHEREIN THE RESTRICTED ACCESS EXEMPTS THE MINI-GAME SUCH THAT ACCESS TO THE MINI-GAME IS AVAILABLE IN ACCORDANCE WITH THE ONE OR MORE FEATURES LIMITING PLAYABILITY BY THE USER
1130

FIG. 11

VIDEO GAMING SYSTEM ENVIRONMENTS PROVIDING MINI-GAMES

FIELD OF THE INVENTION

This invention relates generally to the field of computer gaming, and more particularly embodiments of the invention relate to computer gaming systems and methods providing mini-games.

BACKGROUND OF THE INVENTION

Users of computer gaming systems participate in video games for various reasons such as the intrigue with exploring captivating environments, drive to overcome formidable challenges, feeling a surge of achievement, development of a skill, and/or overall a sense of accomplishment in playing the games. Game developers often design games in a way that will illicit these feelings and encourage user engagement with the video games. Many video games are designed to encourage in-application purchases and various other user behaviors. However, there are opportunities for augmenting user engagement with user behaviors that often go unrealized. Thus, a need exists for improved systems and methods for encouraging certain behaviors and user engagement through video games.

BRIEF SUMMARY

Shortcomings of the prior art are overcome and additional advantages are provided through the provision of a computer system that includes at least one processor, a communication interface communicatively coupled to the at least one processor, and a memory device storing executable code. When executed, the executable code causes the at least one processor to, in part, track user progress, via a user resource profile, towards achieving one or more real-world goals based on a plurality of resource-related actions performed by a user, at least one of the plurality of resource-related actions comprising storing a real-world resource to a user-specific location, wherein the user resource profile provides, at least in part, information about the user-specific location. Further, the at least one processor determines, from the user resource profile, that the user is not progressing to achieve the one or more real-world goals. Based on determining that the user is not progressing, user access to one or more tasks that can be performed by the user via an online video game is restricted, where the restricting exempts, based on satisfaction of a real-world resource condition of the real-world resource associated with the user-specific location, a mini-game playable within the online video game, where the mini-game includes one or more features limiting playability by the user.

Additionally, disclosed herein is a computing system that includes at least one processor, a communication interface communicatively coupled to the at least one processor, and a memory device storing executable code. When executed, the executable code causes the at least one processor to, in part, track user progress, via a user resource profile, towards achieving one or more real-world goals based on a plurality of resource-related actions performed by a user, at least one of the plurality of resource-related actions comprising storing a real-world resource to a user-specific location, wherein the user resource profile provides, at least in part, information about the user-specific location. The at least one processor determines, from the user resource profile, that the user is not progressing to achieve the one or more real-world goals, and ascertains an amount of time that has lapsed since the user initiated play of an online video game. Based on determining that the user is not progressing, user access to one or more tasks that can be performed by the user via the online video game is restricted, where the restricting exempts a mini-game playable within the online video game if the amount of time that has lapsed is less than a predefined threshold limit, the mini-game comprising one or more features limiting playability by the user.

Also disclosed herein is a computer-implemented method that includes, in part, tracking user progress, via a user resource profile, towards achieving one or more real-world goals based on a plurality of resource-related actions performed by a user, at least one of the plurality of resource-related actions comprising storing a real-world resource to a user-specific location, wherein the user resource profile provides, at least in part, information about the user-specific location. The method also includes determining, from the user resource profile, that the user is not progressing to achieve the one or more real-world goals. Further, based on determining that the user is not progressing, the method includes restricting user access to one or more tasks that can be performed by the user via an online video game, the restricting exempting, based on satisfaction of a real-world resource condition of the real-world resource associated with the user-specific location, a mini-game playable within the online video game, the mini-game comprising one or more features limiting playability by the user.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 8 depicts a block diagram of an example method for providing a mini-game, in accordance with an embodiment of the present invention;

FIG. 9 depicts a block diagram of an example method for providing a mini-game, in accordance with an embodiment of the present invention;

FIG. 10 depicts a block diagram of an example method for providing a mini-game, in accordance with an embodiment of the present invention; and FIG. 11 depicts a block diagram of an example method for providing a mini-game, in accordance with an embodiment of the present invention.

DETAILED DESCRIPTION

Figure 1:
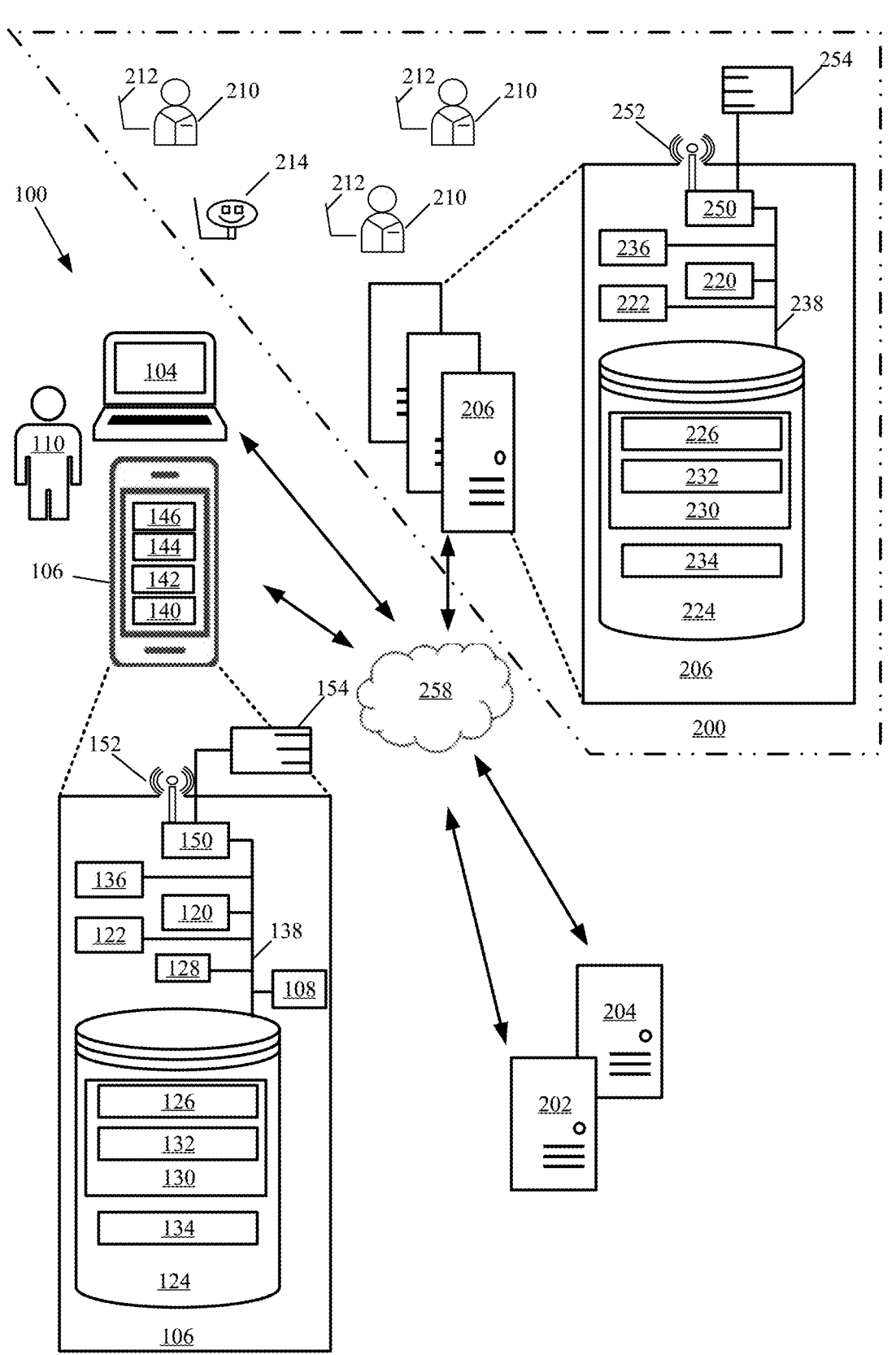
FIG. 1 illustrates a computing environment that includes a computer system to provide a video game to a user device, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment (s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements. Furthermore, a device or structure that is configured in a certain way is configured in at least that way, but may also be configured in ways that are not listed.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise (e.g., company, organization, institution, business, university, etc.) that hosts, maintains, or uses computer systems that provide functionality for the disclosed systems and methods. In particular, the term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes computer system that includes a video game, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device 104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processor 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processor 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications that comprise computer-executable program instructions or code executed by the processing device 120 to implement, via the user device 104, 106, the functions described herein. For example, the memory device 122 may store applications and/or association data related to a conventional web browser application and/or an enterprise-distributed application (e.g., a mobile application). These applications also typically provide a graphical user interface (GUI) that is displayed via the display 140 that allows the user 110 to perform functions via the application including to communicate, via the user device 104, 106 with the enterprise system 200, and/or other devices or systems. The GUI on the display 140 may include features for displaying information and accepting inputs from users, and may include input controls such as fillable text boxes, data fields, hyperlinks, pull down menus, check boxes, and the like.

In various embodiments, the user 110 may download, sign into, or otherwise access the application from an enterprise system 200 or from a distinct application server. In other embodiments, the user 110 interacts with the enterprise system 200 via a web browser application in addition to, or instead of, the downloadable version of the application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a micro-drive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/ b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with a gaming functionality and/or application. In particular, the enterprise system 200 may include an enterprise mobile software application that includes a gaming functionality that may be installed on or otherwise accessed by the user device 104, 106. When the user 110 accesses the gaming functionality, the user 110 may be rewarded by performing various tasks. In particular, the user 110 may receive rewards for accomplishing various goals related to financial wellness. The gaming functionality may help the user develop smart financial habits with monetary rewards for developing these habits and is rooted in behavioral economics.

In general, the gaming application disclosed herein may operate via external systems 202, 204 and provides front-end functionalities that enable the user 110 to interact with games. In particular, the external systems 202, 204 may host the game server(s). In one embodiment, the external systems 202, 204 include Amazon Web Services (AWS), which provides a workflow for developing, deploying, and hosting the gaming application. Further, the games may incorporate user/customer profiles that may be linked to that specific user's/customer's profile that is stored within or otherwise associated with the enterprise system 200. By syncing the user/customer profile for the gaming application with the user/customer profile of the enterprise system 200, the gaming application can access information about the user 110 that is derived from the user/customer profile of the enterprise system 200. This enables the gaming application to utilize user/customer data in order to personalize the game in accordance with various enterprise objectives. In a non-limiting example, user/customer data stored by the enterprise system 200 that indicates current account balances may be accessed by the game server(s) of the external system 202, 204 in order to personalize the gaming experience for the user 110 by encouraging certain financial behaviors. Other external system 202, 204 may include promotional prize server(s) that can be configured to generate one or more random numeric outcomes based on one or more rules defining a win likelihood.

To perform various functionalities associated with the gaming application, the game server(s) may be configured to make an API call to the prize server(s) to provide information necessary to generate a random numeric outcome. For instance, the API call may indicate a current game at a current level, and the prize server(s) process the information provided to generate a random number based on that information in accordance with various rules defining a win likelihood. The prize server(s) then provide results from the random number generator, which is used to determine a monetary reward in response to the actions performed by the user 110. In addition, the monetary rewards obtained as a result of performing various actions via the gaming application may be transferred to user/customer accounts identified by the user/customer profile of the enterprise.

Figure 2:
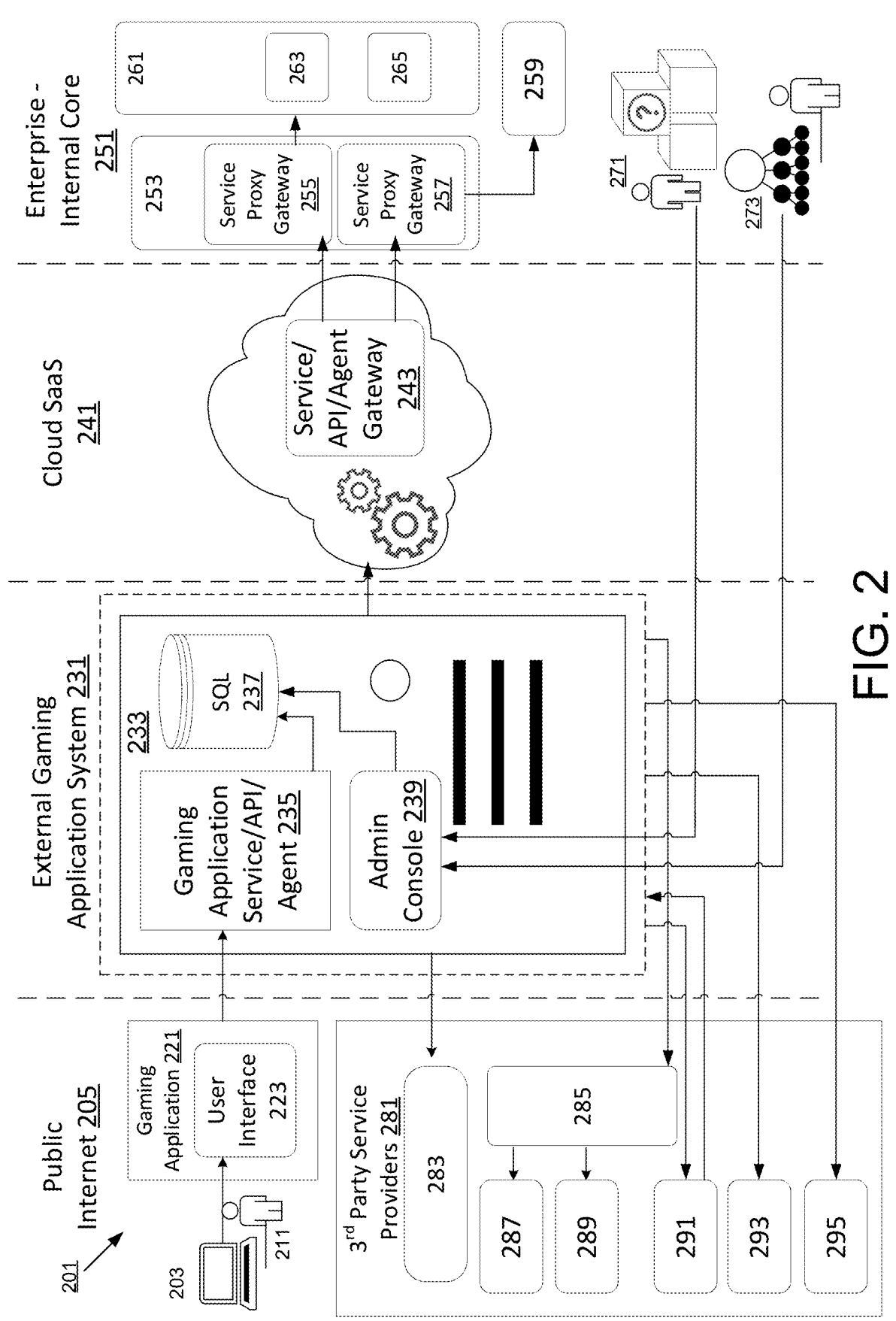
FIG. 2 depicts an example flow diagram for network communication associated with a gaming application, in accordance with an embodiment of the present invention.

FIG. 2 depicts an example flow diagram 201 for network communication associated with an external gaming application system 231, in accordance with an embodiment of the present invention. In particular, the flow diagram 201 depicts a user 211 providing one or more inputs, via a user device 203, to access the gaming application 221 across a public network 205 (e.g., public internet). The gaming application 221 includes a user interface 223 through which the user 211 interacts in order to play electronic game(s) (i.e., video game(s)). The game(s) may be played when the user 211 interacts via the user interface 223 and/or through other input device(s) (e.g., a joystick, controller, keyboard, motion sensing device, etc.). Inputs provided by the user 211 may generate visual feedback through a display of the user device 203.

The gaming application 221 is configured to communicate with an external gaming application system 231 that include server(s) 233 that are used to host the gaming application 221. Example cloud-based sever(s) 233 include, for example, AWS. The cloud-based server(s) 233 that host the gaming application 221 include the gaming application service/API/agent 235 that receives an API call from the gaming application 221. The API call utilizes a uniform resource identifier (URI), such as a URL, that identifies the cloud-based server(s) 233, incorporates the application layer protocol (e.g., the HTTP method) indicating the desired action to be performed by the service/API/agent 235 (e.g., the data to be extracted, the functionality to be performed, etc.), includes a header so that the service/API/agent 235 understands the request, and includes an API key or access token used by the service/API/agent 235 to authenticate the API call. The service/API/agent 235 accesses data from the relational database 237 (e.g., SQL database), which may include a collection of structured data needed for the gaming application 221 to integrate various features. The admin console 239 is used by support and developers to provide administrative functions (e.g., provide support for customers, check on the health of the external gaming application system, etc.).

The external gaming application system is integrated with a cloud SaaS 241, which is configured to receive API calls from the cloud-based server(s) 233 to access user data associated with a user profile of the user 211. In a non-limiting example, the user data includes information associated with financial services and products offered by the enterprise such as direct deposit information, current financial balance information, financial savings information, financial transaction history, etc.). The cloud SaaS 241 includes a service/API/agent gateway 243, which acts an edge gateway or network entry point for the enterprise-internal core system 251. The service/API/agent gateway 243 may provide, according to one embodiment, network translation between networks that use different protocols and may include routers, routing switches, multiplexers, etc. In one particular embodiment, the service/API/agent gateway 243 includes various permissions to perform calls to fetch the user data.

Retrieval of user data within the enterprise-internal core system 251 is facilitated by use of service proxy gateway(s) 255, 257 of the gateway platform 253. The gateway platform 253 is a multichannel API gateway configured to provide security, control, integration and optimized access to fetch user data. The service proxy gateway(s) 255, 257 are modules that receive the API requests and forward them to defined endpoints within the internal enterprise system 261. In particular, the service proxy gateway(s) 255, 257 facilitate load balancing, access filtering, caching, etc. The internal enterprise system 261 includes an API-powered business ecosystem that enables the enterprise to perform various backend services and business functionalities. The internal enterprise system 261 includes service/API/agent systems 263, 265 that can be used to access the user data from original data sources and used to facilitate payments from a holding account of the cloud-based server(s) 233 so that the financial payments can be transferred to deposit account(s) associated with the user profile of the user 211. According to various embodiments, the financial payments may be made according to a predefined schedule and/or in response to a request from the user 211. The enterprise-internal core system 251 also includes a digital identity and authentication system 259 that is used to authenticate the user 211 and link the user's gaming profile/account to their user profile associated with the enterprise. The enterprise internal core system 251 is also used by support agents 271 to provide customer support, resolve customer inquiries, etc. Further, the enterprise-internal core system 251 is used by administrators 273 to provide administrative functions for the external gaming application system 231.

Various third-party service providers 281 are also integrated with the external gaming application system 231. One example third-party service provider includes a game operator system 283 that includes promotional prize server(s) that can be configured to generate one or more random numeric outcomes based on one or more rules defining a win likelihood. A communication provider 285 may provide digital communications such as electronic messages through a communications platform 287 and push notifications through an operating system 289. A marketing analysis platform 291 may be used to analyze the efficacy of various messaging and communications associated with the gaming application system 231 and can provide feedback that can be used by the gaming application system 231 to modify functionalities to align with enterprise objectives. For example, the marketing analysis platform 291 may be used for inbound marketing channel attribution and outbound marketing channel attribution so that the enterprise may determine how marketing tactics influence customer interactions. A monitoring system provider 293 may provide off-duty support to detect problems with the gaming application system 231 by using real-time monitoring. When a problem is detected, the monitoring system provider 293 distributes an alert so that the problem can be resolved. An analytics provider 295 may analyze ways in which users interact with the gaming application system 231 in order to perform user experience analysis. Various additional or alternative third-party service providers 281 may also be utilized according to various embodiments.

Figures 3A, 3B, 3C:
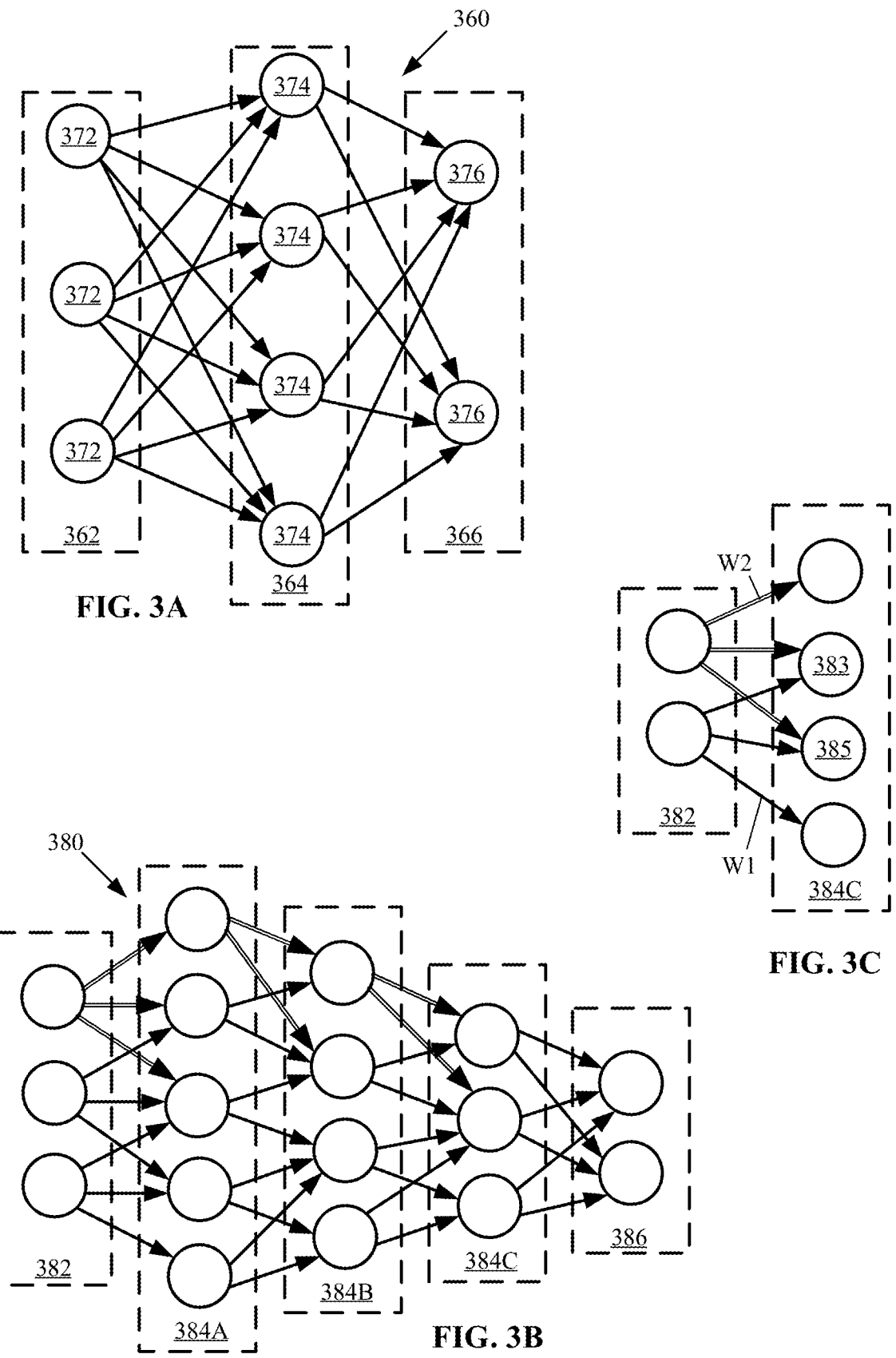
FIG. 3A is a diagram of a feedforward network, according to at least one embodiment, utilized in machine learning.
FIG. 3B is a diagram of a convolution neural network, according to at least one embodiment, utilized in machine learning.
FIG. 3C is a diagram of a portion of the convolution neural network of FIG. 3B, according to at least one embodiment, illustrating assigned weights at connections or neurons.

An artificial neural network (ANN), also known as a feedforward network, may be utilized, e.g., an acyclic graph with nodes arranged in layers. FIG. 3A is a diagram of an example feedforward network, according to at least one embodiment, utilized in machine learning. A feedforward network, such as feedforward network 360 referenced in FIG. 3A, may include a topography with a hidden layer 364 between an input layer 362 and an output layer 366. The input layer 362, having nodes commonly referenced in FIG. 3A as input nodes 372 for convenience, communicates input data, variables, matrices, or the like to the hidden layer 364, having nodes 374. The hidden layer 364 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data are communicated to the nodes 372 of the input layer, which then communicates the data to the hidden layer 364. The hidden layer 364 may be configured to determine the state of the nodes in the respective layers and assign weight coefficients or parameters of the nodes based on the edges separating each of the layers, e.g., an activation function implemented between the input data communicated from the input layer 362 and the output data communicated to the nodes 376 of the output layer 366. It should be appreciated that the form of the output from the neural network may generally depend on the type of model represented by the algorithm. Although the feedforward network 360 of FIG. 3A expressly includes a single hidden layer 364, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 380 in FIG. 3B. As in the basic feedforward network 360 of FIG. 3A, the illustrated example of FIG. 3B has an input layer 382 and an output layer 386. However where a single hidden layer 364 is represented in FIG. 3A, multiple consecutive hidden layers 384A, 384B, and 384C are represented in FIG. 3B. The edge neurons represented by white-filled arrows highlight that hidden layer nodes can be connected locally, such that not all nodes of succeeding layers are connected by neurons. FIG. 3C, representing a portion of the convolutional neural network 380 of FIG. 3B, specifically portions of the input layer 382 and the first hidden layer 384A, illustrates that connections can be weighted. In the illustrated example, labels W1 and W2 refer to respective assigned weights for the referenced connections. Two hidden nodes 383 and 385 share the same set of weights W1 and W2 when connecting to two local patches.

Figure 4:
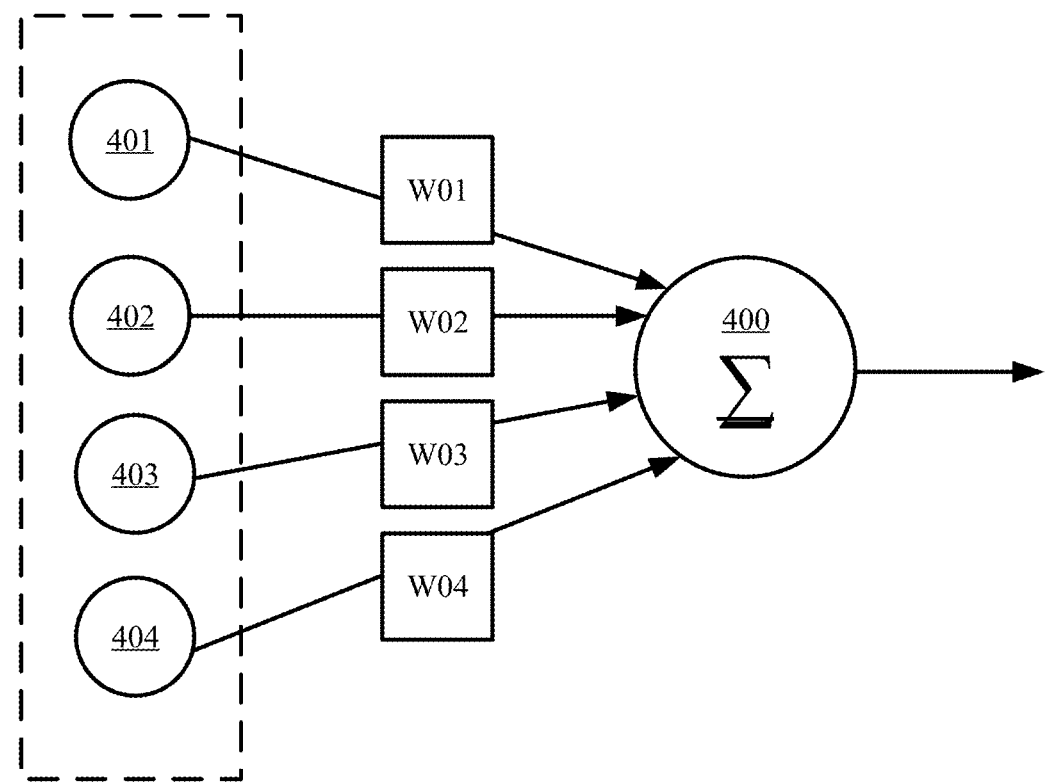
FIG. 4 is a diagram representing an exemplary weighted sum computation in a node in an artificial neural network.

Weight defines the impact a node in any given layer has on computations by a connected node in the next layer. FIG. 4 represents a particular node 400 in a hidden layer. The node 400 is connected to several nodes in the previous layer representing inputs to the node 400. The input nodes 401, 402, 403 and 404 are each assigned a respective weight W01, W02, W03, and W04 in the computation at the node 400, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 5:
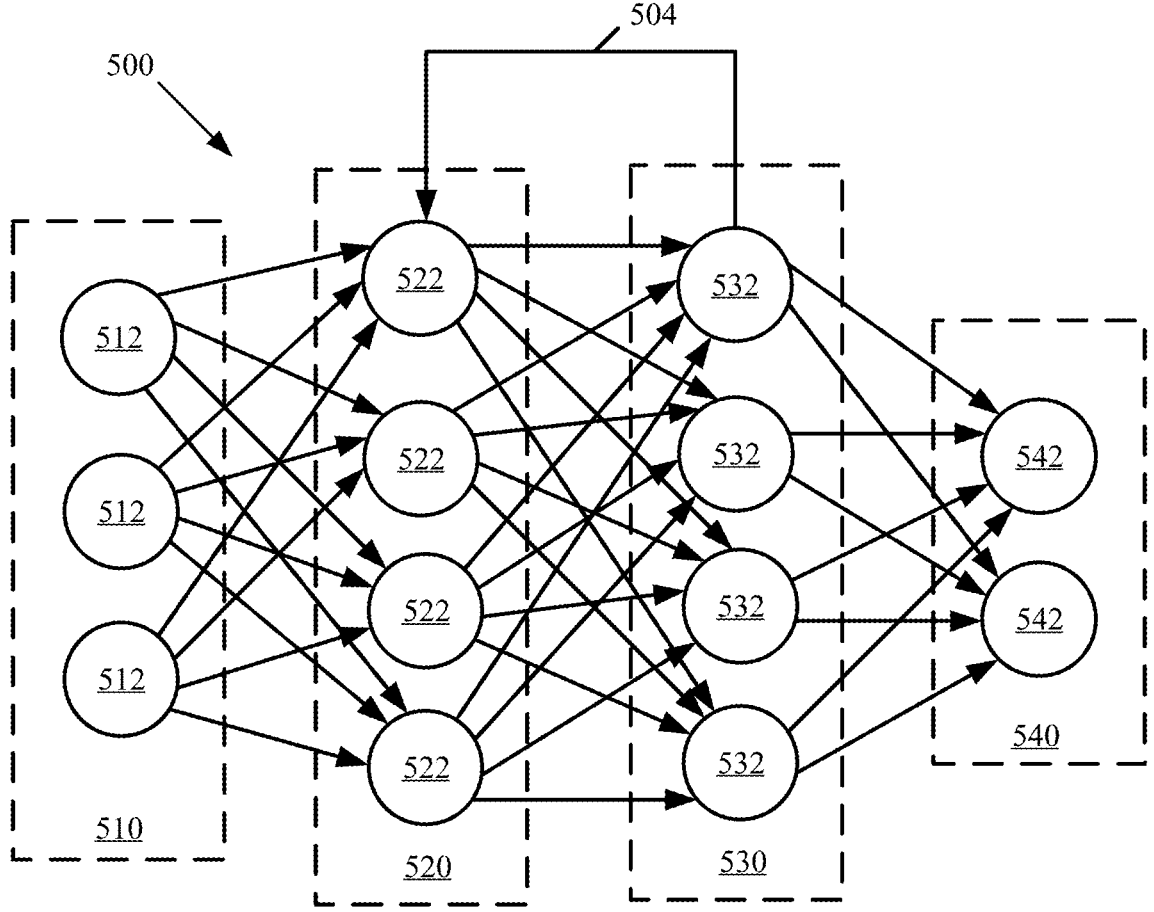
FIG. 5 is a diagram of a Recurrent Neural Network RNN, according to at least one embodiment, utilized in machine learning.

An example for a Recurrent Neural Network RNN is referenced as 500 in FIG. 5. As in the basic feedforward network 360 of FIG. 3A, the illustrated example of FIG. 5 has an input layer 510 (with nodes 512) and an output layer 540 (with nodes 542). However, where a single hidden layer 364 is represented in FIG. 3A, multiple consecutive hidden layers 520 and 530 are represented in FIG. 5 (with nodes 522 and nodes 532, respectively). As shown, the RNN 500 includes a feedback connector 504 configured to communicate parameter data from at least one node 532 from the second hidden layer 530 to at least one node 522 of the first hidden layer 520. It should be appreciated that two or more and up to all of the nodes of a subsequent layer may provide or communicate a parameter or other data to a previous layer of the RNN 500. Moreover and in some embodiments, the RNN 500 may include multiple feedback connectors 504 (e.g., connectors 504 suitable to communicatively couple pairs of nodes and/or connector systems 504 configured to provide communication between three or more nodes). Additionally or alternatively, the feedback connector 504 may communicatively couple two or more nodes having at least one hidden layer between them, i.e., nodes of nonsequential layers of the RNN 500.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 6:
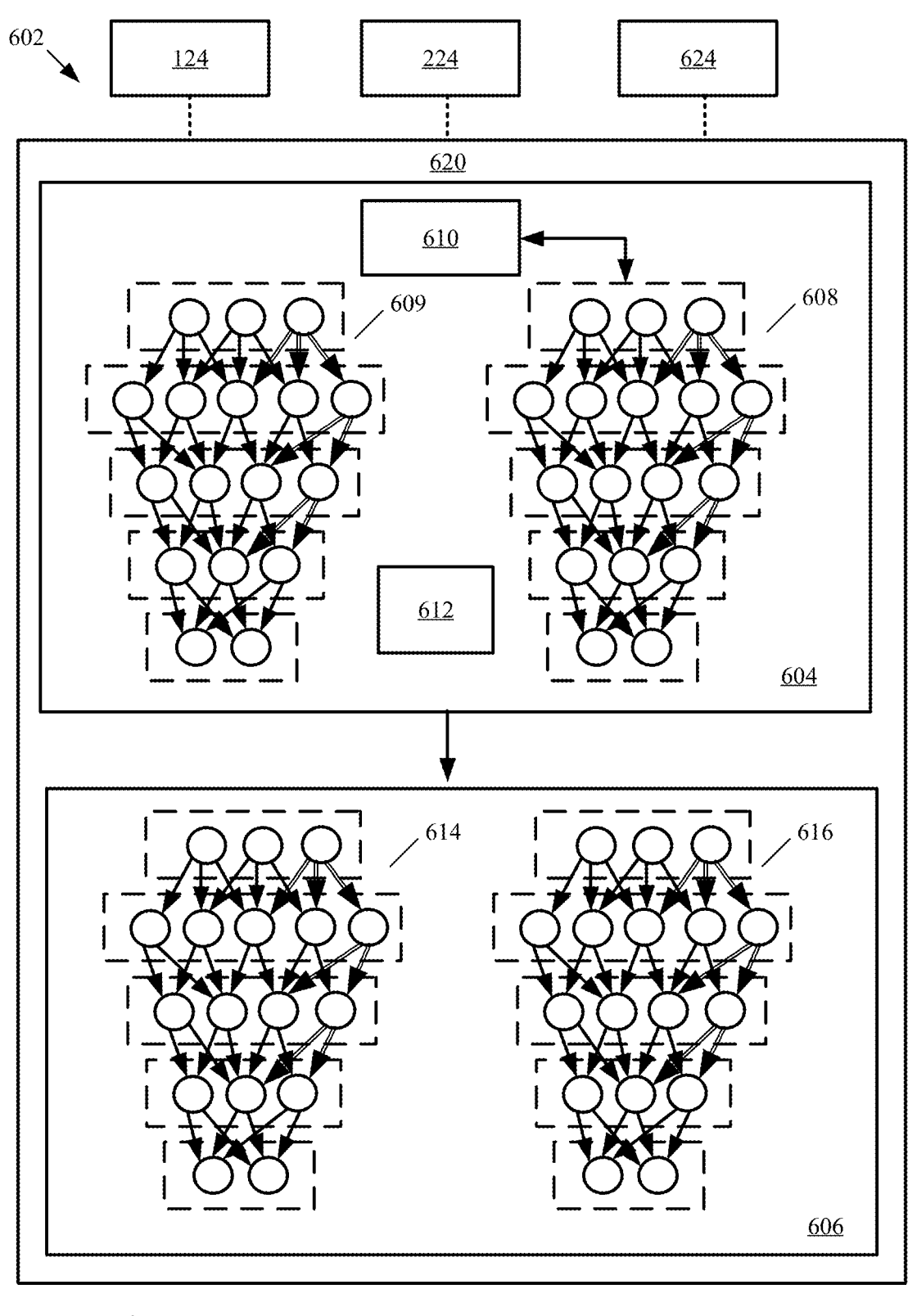
FIG. 6 is a schematic logic diagram of an artificial intelligence program including a front-end and a back-end algorithm.

Referring now to FIG. 6 and some embodiments, an AI program 602 may include a front-end algorithm 604 and a back-end algorithm 606. The artificial intelligence program 602 may be implemented on an AI processor 620, such as the processing device 120, the processing device 220, and/or a dedicated processing device. The instructions associated with the front-end algorithm 604 and the back-end algorithm 606 may be stored in an associated memory device and/or storage device of the system (e.g., storage device 124, memory device 122, storage device 224, and/or memory device 222) communicatively coupled to the AI processor 620, as shown. Additionally or alternatively, the system may include one or more memory devices and/or storage devices (represented by memory 624 in FIG. 6) for processing use and/or including one or more instructions necessary for operation of the AI program 602. In some embodiments, the AI program 602 may include a deep neural network (e.g., a front-end network 604 configured to perform pre-processing, such as feature recognition, and a back-end network 606 configured to perform an operation on the data set communicated directly or indirectly to the back-end network 606). For instance, the front-end program 606 can include at least one CNN 608 communicatively coupled to send output data to the back-end network 606.

Additionally or alternatively, the front-end program 604 can include one or more AI algorithms 610, 612 (e.g., statistical models or machine learning programs such as decision tree learning, associate rule learning, recurrent artificial neural networks, support vector machines, and the like). In various embodiments, the front-end program 604 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 608 and/or AI algorithm 610 may be used for image recognition, input categorization, and/or support vector training. In some embodiments and within the front-end program 604, an output from an AI algorithm 610 may be communicated to a CNN 608 or 609, which processes the data before communicating an output from the CNN 608, 609 and/or the front-end program 604 to the back-end program 606. In various embodiments, the back-end network 606 may be configured to implement input and/or model classification, speech recognition, translation, and the like. For instance, the back-end network 606 may include one or more CNNs (e.g., CNN 614) or dense networks (e.g., dense networks 616), as described herein.

For instance and in some embodiments of the AI program 602, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 604). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 602 may be trained using a semi-supervised learning process in which some but not all of the output data is known, e.g., a mix of labeled and unlabeled data having the same distribution.

In some embodiments, the AI program 602 may be accelerated via a machine-learning framework 622 (e.g., hardware). The machine learning framework may include an index of basic operations, subroutines, and the like (primitives) typically implemented by AI and/or machine learning algorithms. Thus, the AI program 602 may be configured to utilize the primitives of the framework 622 to perform some or all of the calculations required by the AI program 602. Primitives suitable for inclusion in the machine learning framework 622 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 7:
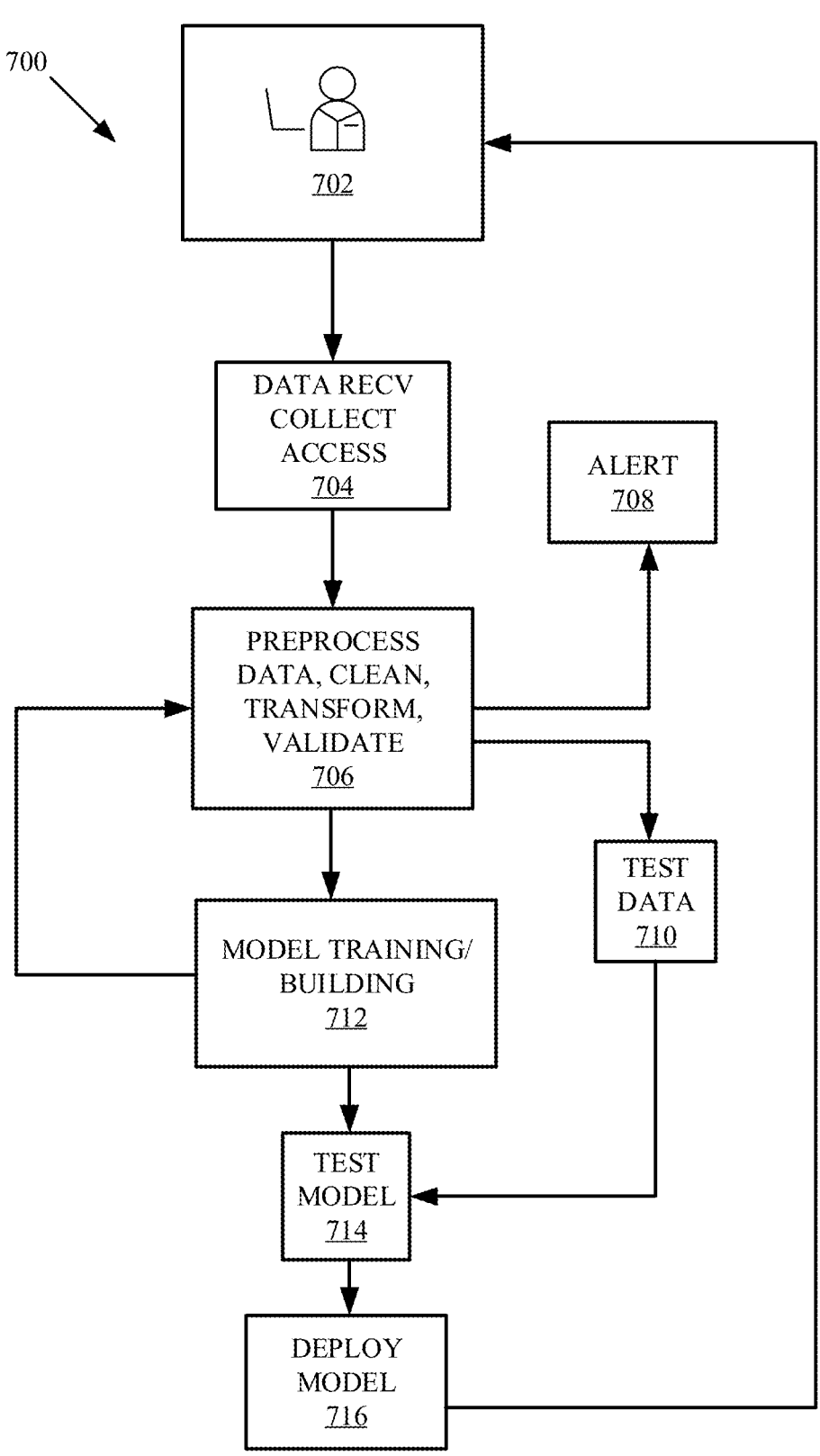
FIG. 7 is a flow chart representing a method, according to at least one embodiment, of model development and deployment by machine learning.

FIG. 7 is a flow chart representing a method 700, according to at least one embodiment, of model development and deployment by machine learning. The method 700 represents at least one example of a machine learning workflow in which steps are implemented in a machine-learning project.

In step 702, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 702 can represent a starting point. However, with regard to continuing or improving an ongoing machine learning workflow, step 702 can represent an opportunity for further user input or oversight via a feedback loop.

In step 704, data is received, collected, accessed, or otherwise acquired and entered as can be termed data ingestion. In step 706, the data ingested in step 704 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 706 is updated with newly ingested data, an updated model will be generated. Step 706 can include data validation, which focuses on confirming that the statistics of the ingested data are as expected, such as that data values are within expected numerical ranges, that data sets are within any expected or required categories, and that data comply with any needed distributions such as within those categories. Step 706 can proceed to step 708 to automatically alert the initiating user, other human or virtual agents, and/or other systems, if any anomalies are detected in the data, thereby pausing or terminating the process flow until corrective action is taken.

In step 710, training test data such as a target variable value is inserted into an iterative training and testing loop. In step 712, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 714, where the model is tested. Subsequent iterations of the model training, in step 712, may be conducted with updated weights in the calculations.

When compliance and/or success in the model testing in step 714 is achieved, process flow proceeds to step 716, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

According to embodiments disclosed herein, in order for a user to play a video game, one or more rules must be satisfied. These rules can include a requirement that a user must exchange a quantity of points or in-game resources in order to progress or advance through the video game. In order to earn the points or in-game resources required to play the video game, the user may have to perform various real-world tasks. Example real-world tasks that the user can perform in order to earn in-game resources can include completing various financial goals. These goals can be set by the user to help the user with certain life objectives. For instance, one example financial goal can include saving money for an upcoming expenditure (e.g., college, a car, a vacation, a house, etc.). Another example financial goal can include investing real-world financial resources to prepare for retirement. Other goals can include completion of reading informational material (e.g., a book, an article, etc.), attending a class, attending an informational session, going to a presentation, etc. to become more knowledgeable about various financial issues such as financial planning or financial preparedness.

An entity, such as a financial institution, can monitor and track the user's completion of these real-world tasks. For example, the entity may be able to track financial transactions made to or from various financial accounts of the user. In another example, the entity may be able to offer online classes or workshops through its website, and the entity can determine whether the user has watched, listened to, or attended these online classes or workshops based on the user logging in to their online user profile in order to access the online classes or workshops. User data associated with the user can be stored and analyzed in order to determine whether the user is making progress towards their real-world goals. If the user completes certain objectives, sub-goals, and/or goals, the user may be rewarded with in-game points or in-game resources that can be used in order to advance in the video game. According to one non-limiting example, as the user completes their goals, the entity (e.g., such as a financial entity) would potentially benefit because some of those goals could be accomplished by the user opening new bank accounts with the bank or depositing more money with the bank.

Advantageously, mini-games can be used to encourage engagement with the video game, and by extension the entity itself, even if the user is ineligible to play the video game due to a lack of progress towards their real-world goals. In addition, the disclosed systems and methods are directed to an improvement in technology at least in part by improving video game technology. Existing video games fail to analyze user data associated with real-world actions taken by the user outside of the video game environment to determine what portions of the game are accessible to the user based on the real-world actions. By restricting access to the video game while exempting a mini-game, video game technology incorporates real-world actions to influence accessibility to portions of the video game.

Further, access to the mini-games still require satisfaction of certain real-world conditions. For example, in one embodiment, in order to have access to the mini-games, the user would have to be within a predetermined time period (e.g., within the first 30 days) of initiating access to the video game. In another example embodiment, as an alternative to the time period limitation or after the time period is complete, the user would be required to satisfy a real-world resource condition, such as having a minimum amount of a resource (e.g., a minimum account balance) deposited with the entity. For instance, in a non-limiting example, the user may be required to have twenty dollars deposited to their account in order to be eligible to access the mini-game. However, various other real-world resource conditions are also contemplated herein. Other non-limiting example real-world resource conditions can include having a minimum number of real-world resource accounts (e.g., checking accounts, savings accounts, money market account, certificate of deposit account, etc.) with the financial institution, a certain type of bank account for the real-world resource, have direct deposit for their real-world resource from the user's employer established with the user's account, etc. If the user satisfies the real-world resource condition, then the user would have access to the mini-game even if the user is not progressing or advancing towards their real-world goals.

In some examples, the real-world goals, and the steps to achieving those goals, may be defined by the user. In other examples, at least some of the goals, and/or the steps to achieving those goals, may be defined by the entity. Other example embodiments may have optional goals recommended by the entity that the user may select based on their personal circumstances. In some embodiments, the optional goals may be recommended by the entity based on information known about the user including, for example, an income level, an age, demographic information, and/or various other life circumstances.

FIG. 8 depicts a block diagram of an example method 800 for providing a mini-game, in accordance with an embodiment of the present invention. At block 805, a computer processor tracks user progress, via a user resource profile, towards achieving one or more real-world goals. The user resource profile can include, for example, a user profile associated with the entity that compiles all information known about the user including, for example, a list of all accounts and an amount of the resource deposited with each of those accounts. The user progress may be tracked by analyzing user data of the user to identify resource-related actions/events (e.g., such as financial transactions, completion of an educational seminar, etc.) that the user has participated in or consummated. By analyzing the user data to ascertain the user progress, the user progress can be tracked in order to determine from the plurality of resource-related actions performed by the user whether the user is progressing towards achieving one or more real-world goals. At least one of the plurality of resource-related actions includes storing a real-world resource to a user-specific location (e.g., a user's financial account, making a payment to a third-party towards paying off debt, etc.). Further, the user resource profile provides, at least in part, information about the user-specific location, where such information can include, for example, a quantity of the resource stored to the user-specific location, a frequency of storing the resource to the user-specific location (e.g., daily, after each paycheck, monthly, etc.), whether the user-specific location has direct deposit set up, and/or various other information about the user-specific location. In some embodiments, the real-world goals are predefined by the user and associated with fiscal objectives of the user.

At block 810, the processor determines, from the user resource profile, that the user is not progressing to achieve the one or more real-world goals. At block 815, based on determining that the user is not progressing, user access to one or more tasks that can be performed by the user via an online video game is restricted. However, the restricting exempts, based on satisfaction of a real-world resource condition of the real-world resource associated with the user-specific location, a mini-game playable within the online video game. The mini-game includes one or more features limiting playability by the user. According to one embodiment, the minimum real-world resource condition includes a minimum real-world resource balance stored to the user-specific location such as, for example, a minimum balance of a certain amount of money deposited to the user's account. In some embodiments, the one or more features limiting playability of the mini-game are selected from the group consisting of a number of in-game actions, a predetermined period of time, a playing session, and in-game resources.

According to some embodiments, the online video game includes an online video game that incorporates and/or includes a theme. In some embodiments, the mini-game may include a legacy game, a puzzle, a hidden object game, an adventure game, a simulation game, an action-adventure game, a strategy game, a sports game, a role-playing game, etc. that is associated with and incorporates the theme of the video game. For example, the video game may be related to a map-based journey with tasks that can be completed along the journey in different world environments (e.g., outer space, in the ocean, in a forest, in a cold cave, etc.) and the min-game may incorporate the world environment theme (e.g., use planets for the outer space theme, fish for the ocean them, forest animals for the forest, snow for the cold cave, etc.).

According to various embodiments, the method 800 may include determining that the user is accessing, via a user device, the online video game, and transmitting, via a network, a notification to the user device indicating that the user access to the one or more tasks is restricted and indicating accessibility of the mini-game. For example, the notification may include a push notification, a SMS text message, a MMS, or other messages. In some embodiments, the notification may include an embedded link, a web address (e.g., URL), a scannable code (e.g., a QR code, barcode, etc.) to prompt the user to interact with the mini-game.

According to various embodiments, the method 800 may include receiving, by the processor, an instruction to initiate the mini-game and identifying a starting location and an end location for the mini-game. For example, the start location may have no portions of the mini-game completed or may include a partially completed mini-game. For example, if the mini-game is a puzzle, the start location may have no portions of the puzzle completed or may have hints and/or portions of the puzzle completed. The start location may be determined based on the user's skill level, age, etc. For example, the mini-game may be adapted based on attributes known about the user. Further, the end location may be determined based on a time limit, a number of moves, completion of a task, a single attempt at completing a task, or various other aspects. The end location is determined by one or more features limiting playability by the user. For instance, the mini-game generally requires some limitation so that the mini-game is not continually playable without resetting. In some embodiments, once the end location has been reached, the mini-game can no longer be played until the mini-game resets (e.g., after a predetermined period of time). Specifically, in some embodiments, the one or more features limiting playability of the mini-game is reset after a predetermined period of time such that if the user completes the playability of the mini-game in accordance with the one or more features limiting the playability, the user is permitted to play the mini-game again after the predetermined period of time. In some embodiments, the predetermined period of time is daily, and the mini-game is selected from a plurality of mini-games available to be selected, and each day a random mini-game from the plurality of mini-games is selected for play within the online video game. In addition, the processor transmits, via a network, one or more control signals to a user device of the user, where the one or more control signals initiate displaying, via a user interface of the user device, a video game interface that includes one or more control inputs that, based upon indicia provided by the user and associated with the one or more control inputs, enable the user to perform one or more functionalities of the mini-game. The indicia may be, for example, the user selecting via the user interface one or more of the control inputs.

According to various embodiments, the user-specific location includes a real-world entity repository associated with a user-specific alphanumeric identifier that is unique to the user-specific location. In a non-limiting example, the real-world entity repository may include a bank account, and the user-specific alphanumeric identifier may include an account number that is unique to the real-world bank account. In some embodiments, the user progress is tracked based on a resource action history that stores user data of the user, the resource action history recording real-world resource actions of the real-world resource made by the user.

In some embodiments, the method 800 further includes restoring, based on the user access being restricted, the user access to the one or more tasks in response to identifying one or more resource actions taken by the user toward achieving the one or more real-world goals.

FIG. 9 depicts a block diagram of an example method 900 for providing a mini-game, in accordance with an embodiment of the present invention. Aspects or features of the method 800 described above are also applicable to method 900 but are not repeated here for conciseness. At block 905, user progress towards achieving one or more real-world goals is tracked via a user resource profile and based on a plurality of resource-related actions performed by a user. At least one of the plurality of resource-related actions include storing a real-world resource to a user-specific location, where the user resource profile provides, at least in part, information about the user-specific location. At block 910, the processer determines from the user resource profile that the user is not progressing to achieve the one or more real-world goals. At block 915, an amount of time that has lapsed since the user initiated play of an online video game is ascertained. For instance, the user may initiate play of the online video game by setting up a video game profile or performing one or more tasks to advance within the online video game. The amount of time that has lapsed can be, for example, a certain number of days. In one non-limiting embodiment, the user may be granted access to the mini-game irrespective of whether the user is progressing towards the one or more real-world goals for the first thirty days. In some embodiments, additional conditions must be satisfied in order to obtain access to the mini-game if the amount of time has lapsed. At block 920, based on determining that the user is not progressing, the processor restricts user access to one or more tasks that can be performed by the user via the online video game, the restricting exempting a mini-game playable within the online video game if the amount of time that has lapsed is less than a predefined threshold limit. For example, the predetermined threshold limit may be a certain number of hours, days, weeks, etc. Further, the mini-game includes one or more features limiting playability by the user.

FIG. 10 depicts a block diagram of an example method 1000 for providing a mini-game, in accordance with an embodiment of the present invention. Aspects or features of the methods 800 and 900 described above are also applicable to method 1000 but are not repeated here for conciseness. At block 1005, the processor tracks, via a user resource profile, user progress towards achieving one or more real-world goals, where the tracking is based on a plurality of resource-related actions performed by a user, and at least one of the plurality of resource-related actions include storing a real-world resource to a user-specific location, and where the user resource profile provides, at least in part, information about the user-specific location. At block 1010, the processor determines, from the user resource profile, that the user is not progressing to achieve the one or more real-world goals.

At block 1015, the processor restricts, based on determining that the user is not progressing, user access to one or more tasks that can be performed by the user via an online video game, where the restricting exempts, based on one or more predefined conditions, a mini-game playable within the online video game, where the mini-game includes one or more features limiting playability by the user. At block 1020, the processor transmits, across a network, to a user device an electronic communication comprising an embedded link to access the mini-game. According to various embodiments, the embedded link may include a web address (e.g., URL), a hyperlink, a scannable code (e.g., a QR code, barcode, etc.), etc. According to various embodiments, the embedded link may be transmitted according to a predefined schedule. In some embodiments, the embedded link is transmitted at a time predicted, by a prediction model, to have a highest probability that the user will play the mini-game. In some examples, the prediction model is trained using training data in accordance with the method described herein in FIG. 7. The prediction model may predict that based on various factors known about the user and/or users having attributes similar to the user that sending the electronic communication in the evening may result in the user selecting the embedded link to access the mini-game. For example, in one non-limiting embodiment, the prediction model may be trained to predict a time that users having certain attributes (e.g., profession, age, geographic region, etc.) are most likely to interact with the embedded link to access the mini-game, and then the trained prediction model may be deployed and applied to the user data to form a prediction about the user.

FIG. 11 depicts a block diagram of an example method 1100 for providing a mini-game, in accordance with an embodiment of the present invention. Aspects or features of the methods 800, 900, and 1000 described above are also applicable to method 1100 but are not repeated here for conciseness. At block 1105, the processor receives an instruction to integrate a mini-game module of a mini-game into an online video game and based thereon integrate the mini-game module into the online video game, wherein the mini-game comprises one or more features limiting playability by the user. The module may be integrated based on one or more rules to automate logical management operations of the online video game. At block 1110, the processor determines that the user is accessing, via a user device, the online video game. At block 1115, transmit, via a network, one or more control signals to the user device of the user to initiate displaying, via a user interface of the user device, a video game interface of the online video game, the video game interface comprising one or more control inputs for the user to perform one or more functionalities via the online video game, at least one of the one or more control inputs being configured to initiate play of the mini-game. At block 1120, the processor tracks, via a user resource profile, user progress towards achieving one or more real-world goals based on a plurality of resource-related actions performed by a user, at least one of the plurality of resource-related actions comprising storing a real-world resource to a user-specific location, wherein the user resource profile provides, at least in part, information about the user-specific location. At block 1125, the processor determines, from the user resource profile, that the user is not progressing to achieve the one or more real-world goals. At block 1130, the processor restricts, based on the determining that the user is not progressing, user access to a plurality of functionalities available through the online video game, wherein the restricted access exempts the mini-game such that access to the mini-game is available in accordance with the one or more features limiting playability by the user.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computer system, comprising:
at least one processor;
a communication interface communicatively coupled to the at least one processor; and
a memory device storing executable code that, when executed, causes the at least one processor to:
track user progress, via a user resource profile, towards achieving one or more real-world goals based on a plurality of resource-related actions performed by a user, at least one of the plurality of resource-related actions comprising storing a real-world resource to a user-specific location, wherein the user resource profile provides, at least in part, information about the user-specific location;
determine, from the user resource profile, that the user is not progressing to achieve the one or more real-world goals;
responsive to the determination that the user is not progressing, transmit a notification to the user device over a network, wherein the notification communicates that access to one or more tasks within an online video game has been restricted, wherein the notification includes a machine-readable embedded link to access a mini-game that is a module of the online video game, and wherein the notification is transmitted is at a time predicted, by a prediction model, to have a highest probability that the user will play the mini-game; and
restrict, based on the determining that the user is not progressing, user access to one or more tasks that can be performed by the user via the online video game, the restricting exempting, based on satisfaction of a real-world resource condition of the real-world resource associated with the user-specific location, the mini-game playable within the online video game, the mini-game comprising one or more features limiting playability by the user.

2. The computer system of claim 1, wherein the real-world resource condition comprises a minimum real-world resource balance stored to the user-specific location.

3. The computer system of claim 1, wherein the online video game comprises a theme and the mini-game is a subset of the online video game that incorporates the theme.

4. The computer system of claim 1, wherein the executable code, when executed,
further causes the at least one processor to:
determine that the user is accessing, via a user device, the online video game.

5. The computer system of claim 1, wherein the executable code, when executed,
further causes the at least one processor to:
receive an instruction to initiate the mini-game;

identify a starting location and an end location for the mini-game, the end location being determined by the one or more features limiting playability by the user; and
transmit, via a network, one or more control signals to a user device of the user to initiate displaying, via a user interface of the user device, a video game interface comprising one or more control inputs that, based upon indicia provided by the user associated with the one or more control inputs, enable the user to perform one or more functionalities of the mini-game.

6. The computer system of claim 1, wherein the user-specific location comprises a real-world entity repository associated with a user-specific alphanumeric identifier unique to the user-specific location.

7. The computer system of claim 1, wherein the user progress is tracked based on a resource action history of the user, the resource action history recording real-world resource actions of the real-world resource made by the user.

8. The computer system of claim 1, wherein the one or more real-world goals are predefined by the user and associated with fiscal objectives of the user.

9. The computer system of claim 1, wherein the executable code, when executed,
further causes the at least one processor to restore, based on the user access being restricted, the user access to the one or more tasks in response to identifying one or more resource actions taken by the user toward achieving the one or more real-world goals.

10. The computer system of claim 1, wherein the one or more features limiting playability of the mini-game are selected from the group consisting of a number of in-game actions, a predetermined period of time, a playing session, and in-game resources.

11. The computer system of claim 1, wherein the one or more features limiting playability of the mini-game is reset after a predetermined period of time such that if the user completes the playability of the mini-game in accordance with the one or more features limiting
the playability, the user is permitted to play the mini-game again after the predetermined period of time.

12. The computer system of claim 11, wherein the predetermined period of time is daily, and wherein the mini-game is selected from a plurality of mini-games available to be selected, and each day a random mini-game from the plurality of mini-games is selected for play within the online video game.

13. A computer system, comprising:
at least one processor;
a communication interface communicatively coupled to the at least one processor; and
a memory device storing executable code that, when executed, causes the at least one processor to:
track user progress, via a user resource profile, towards achieving one or more real-world goals based on a plurality of resource-related actions performed by a user, at least one of the plurality of resource-related actions comprising storing a real-world resource to a user-specific location, wherein the user resource profile provides, at least in part, information about the user-specific location;
determine, from the user resource profile, that the user is not progressing to achieve the one or more real-world goals;
ascertain an amount of time that has lapsed since the user initiated play of an online video game;

responsive to the determination that the user is not progressing, transmit a notification to the user device over a network, wherein the notification communicates that access to one or more tasks within the online video game has been restricted, wherein the notification includes a machine-readable embedded link to access a mini-game that is a module of the online video game, and wherein the notification is transmitted is at a time predicted, by a prediction model, to have a highest probability that the user will play the mini-game;

restrict, based on the determining that the user is not progressing, user access to one or more tasks that can be performed by the user via the online video game, the restricting exempting the mini-game playable within the online video game if the amount of time that has lapsed is less than a predefined threshold limit, the mini-game comprising one or more features limiting playability by the user.

14. The computer system of claim 13, wherein the online video game comprises a theme and the mini-game is a subset of the online video game that incorporates the theme.

15. The computer system of claim 13, wherein the user-specific location comprises a real-world entity repository associated with a user-specific alphanumeric identifier unique to the user-specific location.

16. The computer system of claim 13, wherein the one or more features limiting playability of the mini-game is reset after a predetermined period of time such that if the user completes the playability of the mini-game in accordance with the one or more features limiting playability, the user is permitted to play the mini-game again after the predetermined period of time.

17. The computer system of claim 16, wherein the predetermined period of time is daily, and wherein the mini-game is selected from a plurality of mini-games available to be selected, and each day a random mini-game from the plurality of mini-games is selected for play within the online video game.

18. A computer-implemented method, comprising:

tracking user progress, via a user resource profile, towards achieving one or more real-world goals based on a plurality of resource-related actions performed by a user, at least one of the plurality of resource-related actions comprising storing a real-world resource to a user-specific location, wherein the user resource profile provides, at least in part, information about the user-specific location;

determining, from the user resource profile, that the user is not progressing to achieve the one or more real-world goals;

responsive to the determination that the user is not progressing, transmit a notification to the user device over a network, wherein the notification communicates that access to one or more tasks within an online video game has been restricted, wherein the notification includes a machine-readable embedded link to access a mini-game that is a module of the online video game, and wherein the notification is transmitted is at a time predicted, by a prediction model, to have a highest probability that the user will play the mini-game; and restricting, based on the determining that the user is not progressing, user access to one or more tasks that can be performed by the user via an online video game, the restricting exempting, based on satisfaction of a real-world resource condition of the real-world resource associated with the user-specific location, a mini-game playable within the online video game, the mini-game comprising one or more features limiting playability by the user.

19. The computer-implemented method of claim 18, wherein the method further comprises:

determining that the user is accessing, via a user device, the online video game.

20. The computer-implemented method of claim 19, wherein the method further comprises:

receiving an instruction to initiate the mini-game;

identifying a starting location and an end location for the mini-game, the end location being determined by the one or more features limiting the playability by the user;

and transmit, via a network, one or more control signals to a user device of the user to initiate displaying, via a user interface of the user device, a video game interface comprising one or more control inputs that, based upon indicia provided by the user associated with the one or more control inputs, enable the user to perform one or more functionalities of the mini-game.

\* \* \* \* \*